(12) United States Patent
Kasprzyk et al.

(10) Patent No.: US 10,086,646 B2
(45) Date of Patent: Oct. 2, 2018

(54) ELASTIC WHEEL FOR A RAIL VEHICLE

(71) Applicant: Gutehoffnungshütte Radsatz GmbH, Oberhausen (DE)

(72) Inventors: Thaddäus Kasprzyk, Dorsten (DE); Thomas Hoog, Essen (DE); Christian Kemp-Lettkamp, Wesel (DE); Thomas Gerlach, Neukirchen-Vluyn (DE)

(73) Assignee: Gutehoffnungshütte Radsatz GmbH, Oberhausen (DE)

( * ) Notice: Subject to any disclaimer, the term of this patent is extended or adjusted under 35 U.S.C. 154(b) by 0 days.

(21) Appl. No.: 15/562,688

(22) PCT Filed: Mar. 29, 2016

(86) PCT No.: PCT/EP2016/056780
§ 371 (c)(1),
(2) Date: Sep. 28, 2017

(87) PCT Pub. No.: WO2016/156303
PCT Pub. Date: Oct. 6, 2016

(65) Prior Publication Data
US 2018/0086138 A1  Mar. 29, 2018

(30) Foreign Application Priority Data

Apr. 2, 2015 (EP) .................................... 15162428

(51) Int. Cl.
*B60B 17/00* (2006.01)
(52) U.S. Cl.
CPC ...... *B60B 17/0041* (2013.01); *B60B 17/0048* (2013.01); *B60B 2900/113* (2013.01); *B60B 2900/116* (2013.01); *B60B 2900/325* (2013.01)

(58) Field of Classification Search
CPC ............ B60B 17/0031; B60B 17/0034; B60B 17/0037; B60B 17/0041; B60B 17/0048
See application file for complete search history.

(56) References Cited

U.S. PATENT DOCUMENTS 2,138,506 A    11/1938  Piron
2,175,118 A    10/1939  Hirshfeld
(Continued)

FOREIGN PATENT DOCUMENTS

DE    1157250 B    11/1963
DE    2406206 A1    8/1975
(Continued)

OTHER PUBLICATIONS

International Search Report of International Application No. PCT/EP2016/056780, dated Jul. 4, 2016, three pages.

*Primary Examiner* — Kip T Kotter
(74) *Attorney, Agent, or Firm* — Brinks Gilson & Lione (57) ABSTRACT

A wheel for a rail vehicle has a wheel tire (1) with a ridge (9) formed on the inner circumference of the wheel tire (1), a wheel body (3) with a ring flange (11) formed on the outer circumference and running radially outward, and a clamp ring (5) attached to the wheel body (3) via a fastening means (13), on a side face opposite the ring flange (11). Damping means formed as at least two separate circular ring segments (7) extend between the clamp ring (5) and the circumferential ridge and between the circumferential ridge (9) of the wheel tire (1) and the ring flange in the circumferential direction of the wheel. On at least one side, the circular ring segments (7) have at least two centering cams (19) meshing into corresponding recesses (21). The circular segments (7) have an elastomer core enclosed by metal sheet segments (17).

20 Claims, 12 Drawing Sheets

(56) References Cited

U.S. PATENT DOCUMENTS

| | | | | | |
|---|---|---|---|---|---|
| 2,286,103 | A | * | 6/1942 | Piron | B60B 17/0041 295/11 |
| 2,511,279 | A | * | 6/1950 | Malmquist | B60B 17/0041 295/11 |
| 2,555,023 | A | * | 5/1951 | Boschi | B60B 17/0041 152/41 |
| 2,724,586 | A | * | 11/1955 | Malmquist | B60B 17/0041 105/131 |
| 4,635,990 | A | * | 1/1987 | Golubenko | B60B 17/0041 152/43 |

FOREIGN PATENT DOCUMENTS

| | | |
|---|---|---|
| DE | 102005030966 A1 | 1/2007 |
| EP | 0489455 A1 | 6/1992 |
| EP | 0893279 A1 | 1/1999 |
| EP | 1842692 A1 | 10/2007 |
| EP | 2357092 A1 | 8/2011 |
| FR | 2150532 A1 | 4/1973 |
| GB | 1364135 A | 8/1974 |
| GB | 2153308 A | 8/1985 |

\* cited by examiner

ELASTIC WHEEL FOR A RAIL VEHICLE

TECHNICAL FIELD

The invention relates to a wheel for a rail vehicle, having a wheel tire with a ridge formed on the inner circumference of the wheel tire and extending circumferentially in the direction of the rotation axis, a wheel body with a ring flange formed on the outer circumference and on an axial side face of the wheel body and running radially outward, and a clamp ring attached to the wheel body on a side face opposite the ring flange via a fastening means in a friction-locking and/or positively locking manner, wherein in each case a damping means is arranged between the clamp ring and the circumferential ridge of the wheel tire and between the circumferential ridge of the wheel tire and the ring flange of the wheel body. In addition, the invention relates to a damping means for such a wheel and a wheel tire for such a wheel.

BACKGROUND

Generic types of wheels are used in rail vehicles for local and regional transportation, for streetcars, elevated trains, subway trains, local commuter trains, and metropolitan trains. The wheels for running on rails that are available on the market, all similar rubber-sprung wheels, essentially consist of a wheel body, a clamp ring, individual rubber blocks or one or two rubber rings, and a wheel tire. The general goal of using rubber-sprung wheels is to reduce impact shocks, vibrations, and shaking on the chassis and the coach box. This is achieved by reducing the unsprung masses of the pairs of wheels or portal axles. This is also to have a positive effect on the loads on the rails and on their pavement bed. A reduction of the rolling and squealing noises is achieved through uncoupling by the rubber elements and their damping. An advantage over the classic solid wheel, in which the wheel is made out of steel in one piece, is further that after wear on the wheel, only the wheel tire and possibly the rubber chocks or rubber rings must be changed, whereas with a solid wheel the complete wheel must be replaced. In using this type of wheel, combined shearing and pressure loads occur, which have an effect on the wheel and in particular on the damping action of the wheel. The slope of the arranged elastic dampers relative to the rotation axis determines whether the load of the dampers occurs primarily as a thrust from a radial load during operation or as a combination of thrust and pressure.

For example, compliant or elastic wheels in the form of so-called one- or two-ring wheels are known, in which the elastic connection is achieved between the wheel tire and the two flanges of the wheel body and the clamp ring, respectively, arranged at a lateral distance via one or two rubber rings set up concentrically to the rotation axis of the wheel, or via numerous rubber blocks made of an elastic material arranged circumferentially at a distance from one another with a defined cross-sectional shape. Thereby the rings or blocks often have a substantially rectangular cross-sectional shape. The rubber blocks are thereby made significantly flat and rectangular or with two sloping sides with flat angles. Such rubber-sprung wheels with rubber chocks are subject to high initial stress, and are fixed axially in a positive lock by shoulders on wheel tire, wheel body, and clamp ring. The rubber inlays are here predominantly subject to pressure. These wheels are very stiff and thereby have very low spring or damping qualities.

EP 0 489 455 B1 describes a generic embodiment of a rubber-sprung wheel. Here, the damping means, which are arranged in a U- or V-shaped, ring-shaped intermediate space between wheel body, wheel tire, and clamp ring, are made of a rubber ring, which preferentially forms an obtuse angle of 60° with the wheel axis and is pre-stressed during assembly.

Such wheels are characterized according to the angle setting (15°, 30°, 60° or greater, but ≤90°), by medium to high stiffness, and thereby have low to medium spring or damping qualities. As the angle setting of the rubber rings increases, so does the pressure load in the direction of the thrust load.

Additional generic embodiments are described in U.S. Pat. No. 2,138,506 A and U.S. Pat. No. 2,175,118 A. These wheels are stressed only upon thrust by their rings serving as dampers oriented perpendicular to the rotation axis, and thereby allow relatively high spring deflection. The contact area between elastomer and steel components is provided partially with metal sheets, which are meant to create a positive lock for the transmission of power. When using a vulcanized rubber material, these metal sheets are integrated with the elastic material in a vulcanizing process into a compound component. In addition, a multitude of molded projections on the contact surfaces of these rings have been described. These projections are arranged equally distributed on a circular ring, and are manufactured in the form of sheet-metal pass-throughs.

In addition, another generic embodiment of a wheel is described in EP 0 893 279 B1. In this embodiment, the damping means are formed as two similar rings made of an elastomer material, each of which is frustoconical in shape. Both rings are attached perpendicular to the axis of the wheel and set up symmetrically to a center plane perpendicular to the axis of the wheel, wherein the metallic reinforcements are embedded in each ring and are set up adjacent to the frustoconical inner or outer wall of the ring. Each ring has projections protruding from the frustoconical inner and outer wall of the ring, which projections prevent shifting. Such wheels with annular rings and a corresponding number of projections have the disadvantage that they have multiple alignments between the projections of the rings and the corresponding recesses of the tire, of the wheel body, or of the clamp ring. The required narrow tolerances of the geometry in ring-shaped rubber elements, in particular with metal sheets on the outer sides or in the core, and the projections and their shape and position, increase the expense for manufacturing molds. In the same way, there may be alignment problems in assembly with the adjacent metal parts of the wheel, in which the corresponding recesses also must be manufactured with necessarily exact tolerances in their geometry and their shape and position. Here, one must plan for a certain play in the space in order to allow assembly, which has a negative effect on the direct transmission of force and momentum. In addition, the costs of manufacturing and storing the rings are comparatively high because they are relatively large components. Depending on the wheel diameter, a manufacturer must produce several construction sizes of such rings in order to account for customer wishes. Moreover, the outermost layer of the projections is made of an elastomer material, which in comparison with metal is subject to greater wear. The play in the alignment itself and its enlargement can, due to wear of the outer elastomer layer, lead to or accelerate a possible slip-through of the damping means between the steel components (wheel tire, clamp ring, and wheel body) because of the wearing away of the outer elastomer layer.

Another known embodiment of this type is described in EP 2 357 092 B1. In this embodiment, the damping means are formed as several rubber blocks equally distributed around the circumference of the wheel. The rubber blocks are set up on both sides between the circumferential ridge of the wheel tire and the ring flange of the tire body or the clamp ring. The rubber blocks have the form of ring sectors and run radially perpendicular to the rotation axis of the wheel. Each of the rubber blocks consists of two rubber segments, which are designed either as rubber blocks arranged one above the other in the radial direction and connected to one another via a rubber ridge, or as two separate rubber blocks arranged radially above one another. The rubber segments each have a projection on one side, with which, in the engaged state, they mesh into an assigned recess of the clamp ring or of the ring flange. Such wheels have the disadvantage, in particular, that the radial construction height is relatively great because of the rubber blocks that extend in the radial direction. This is undesirable particularly with low floor vehicles that accommodate the handicapped. In addition, each rubber segment of the rubber blocks has only one projection in each case, so that there is poor acceptance of tangentially running forces or of torsion forces occurring on the rubber segments, in turn leading to more rapid wear and tear of the rubber segments. In particular because the rubber blocks run radially perpendicular to the rotation axis, high combined shear and pressure loads lead to high shearing forces on the rubber blocks, and in particular on the projections of the rubber segments, so that as a result these wear down relatively quickly. In addition, such rubber segments are sensitive to flexing, such as occurs when wheels are operating, so that there may be increased damage due to increased temperature and slippage.

Disadvantageously, the rubber sprung wheels described above have relatively numerous rubber blocks, which during assembly are individually manually positioned, and then during assembly must be secured against being pulled out or falling out. In addition, spring or damping behavior that is not constant may occur when rubber blocks are used because of gaps between the rubber blocks. This inconstant behavior is reinforced by the use of rubber elements, which in the mounted position are not arranged symmetrically to the wheel axis.

SUMMARY OF THE INVENTION

The invention has the object of providing a wheel for a rail vehicle, which avoids the above disadvantages and problems, and facilitates a high capacity to withstand loads, a long lifespan, good spring and damping ability, a low noise load, a small space requirement, a small structural form, easy maintenance and exchangeability, and low cost.

According to the present disclosure, damping means are provided with each of the damping means is configured as at least two separate circular ring segments extending in the circumferential direction of the wheel, each extending in over a circular segment of the wheel with a central angle of at least 30° to a maximum of 180°, wherein on their contact surfaces, at least on one side, the circular ring segments have at least two centering cams extending in the axial direction and spaced from one another in the circumferential direction, which mesh in a positively locking manner into corresponding recesses on the ring flange of the wheel body or on the clamp ring and on the circumferential ridge of the wheel tire, wherein the circular ring segments have an elastomer material as a core, wherein the core of the circular ring segments is enclosed by metal sheet segments, at least on its contact surfaces that bear against the circumferential ridge of the wheel tire and against the clamp ring or the ring flange of the wheel body. According to the invention it is advantageous for the circular ring segments to have a radial height that is smaller than its circumferential length at its radial center.

It is also within the scope of the invention to arrange only one centering can on one contact surface or one side of the circular ring segments, and to arrange a plurality of centering cams, in particular two, on the other contact surface or side.

Through the configuration of the damping means as a plurality of circular ring segments extending in the circumferential direction of the wheel, the damping means are subdivided into a plurality of separate segments between the circumferential ridge and the ring flange and between the circumferential ridge and the clamp ring. It is particularly advantageous for each circular ring segment to have two centering cams on at least one contact surface. This allows a unique positioning of the circular ring segments. In this way, the number of alignments required per piece to be assembled is reduced, and as a result the manufacturing tolerances can be relatively larger. This results in reduced manufacturing costs of the wheel tire, the clamp ring, the damping means, and the wheel body. In addition, assembly of the damping means is simplified, since fewer alignments must be made at the same time per piece. By distributing the damping means in a plurality of equally formed circular ring segments that are smaller in size than complete rings, the space required for storage in assembly and disassembly is reduced. In addition, in certain circumstances, the same circular ring segments can be used for different wheel diameters. Moreover, significantly smaller molds and tools are required for production. Likewise, smaller wheel diameters can be completed. Enclosing the core of the circular ring segments, which is made of an elastomer material, in metal sheet segments enables them to absorb higher shearing and pressure loads and reduces the wear of the damping means. The arrangement of at least two centering cams spaced from one another in the circumferential direction on a circular segment improves the life of the item, since the tangentially running forces or the torsion forces occurring on the circular ring segments can be absorbed directly in the wheel.

In one advantageous embodiment of the invention, the centering cams of the circular ring segment are formed as a closed cup, in which the elastomer material is enclosed fully sealed by the metal sheet segments. Advantageously, the circular ring segments are formed as a compound component composed of a basic body of elastomer material and molded integral metal sheets. In particular, the centering cams of the circular ring segment are cylindrical, parabolic, or frustoconical in shape. These configuration features improve the absorption of occurring forces and extend the lifespan of the circular ring segments, whereby the manufacturing costs are minimized.

In another advantageous embodiment of the invention, at the transition area from the basic form of the metal sheet segment to the centering cams of the circular ring segment, a bead composed of radii is formed, which is set inward into the elastomer material, running around the centering cams. This minimizes the load on the transitional area from the centering cams to the basic body of the circular ring segment.

Advantageously in another embodiment of the invention, the contact surfaces of the circular ring segments and the surfaces of the circumferential ridge and of the clamp ring or the ring flange that bear against these contact surfaces are designed such that they enclose an angle of 45° to 90°, advantageously 74°, with the rotation axis of the wheel. This allows a balanced distribution of the loads that occur in the thrust and pressure loads and improved spring and damping behavior.

Other advantageous embodiments of the invention result from the following description of the drawings.

DETAILED DESCRIPTION OF THE DRAWINGS

Equivalent parts are always marked in the various figures of the drawings with the same reference number.

The present invention is not limited to the examples of embodiments and is not thereby limited to all or several features of the combinations of features that are described, but rather each individual partial feature of each and every example of an embodiment is separate from all the others in connection with the partial features described for it, and also in combination with any features of another embodiment example that is significant for the subject of the invention.

Figure 1:
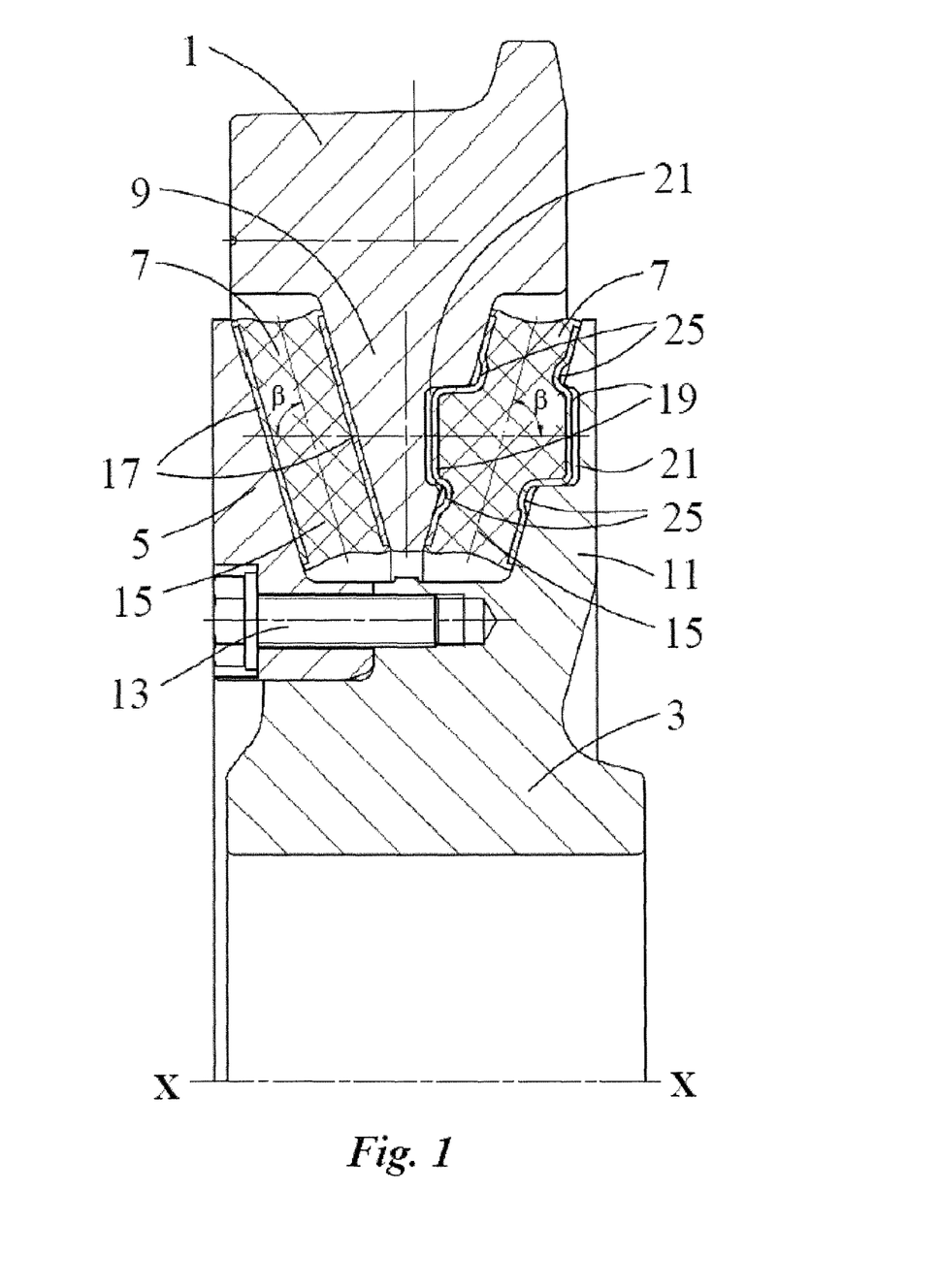
FIG. 1 shows a partial section through a first embodiment of a wheel according to the invention in the area of the fastening means for the clamp ring with a first embodiment of a circular ring segment.
Figure 2:
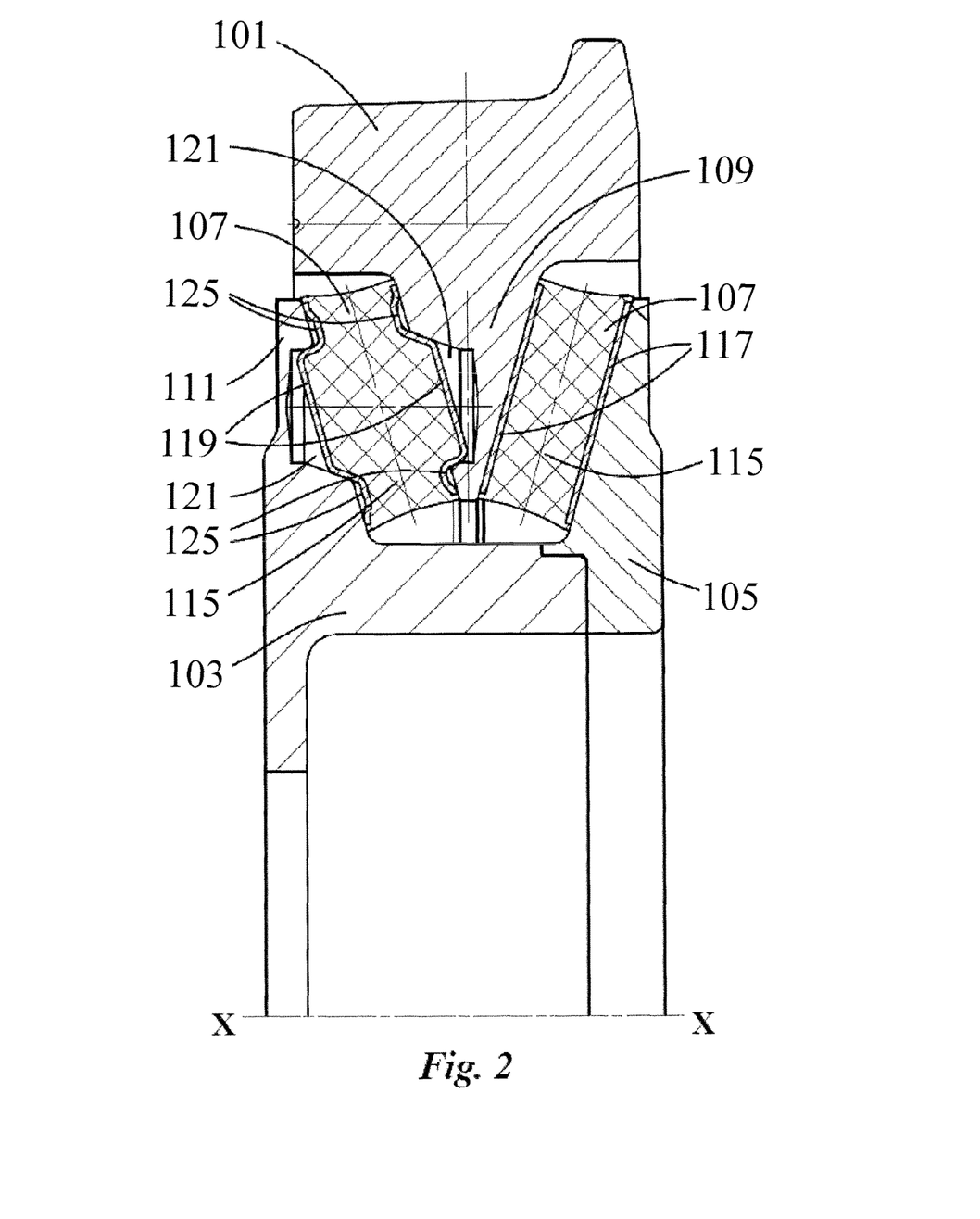
FIG. 2 shows a partial section through a second embodiment of a wheel according to the invention with a second embodiment of a circular ring segment.
Figure 7:
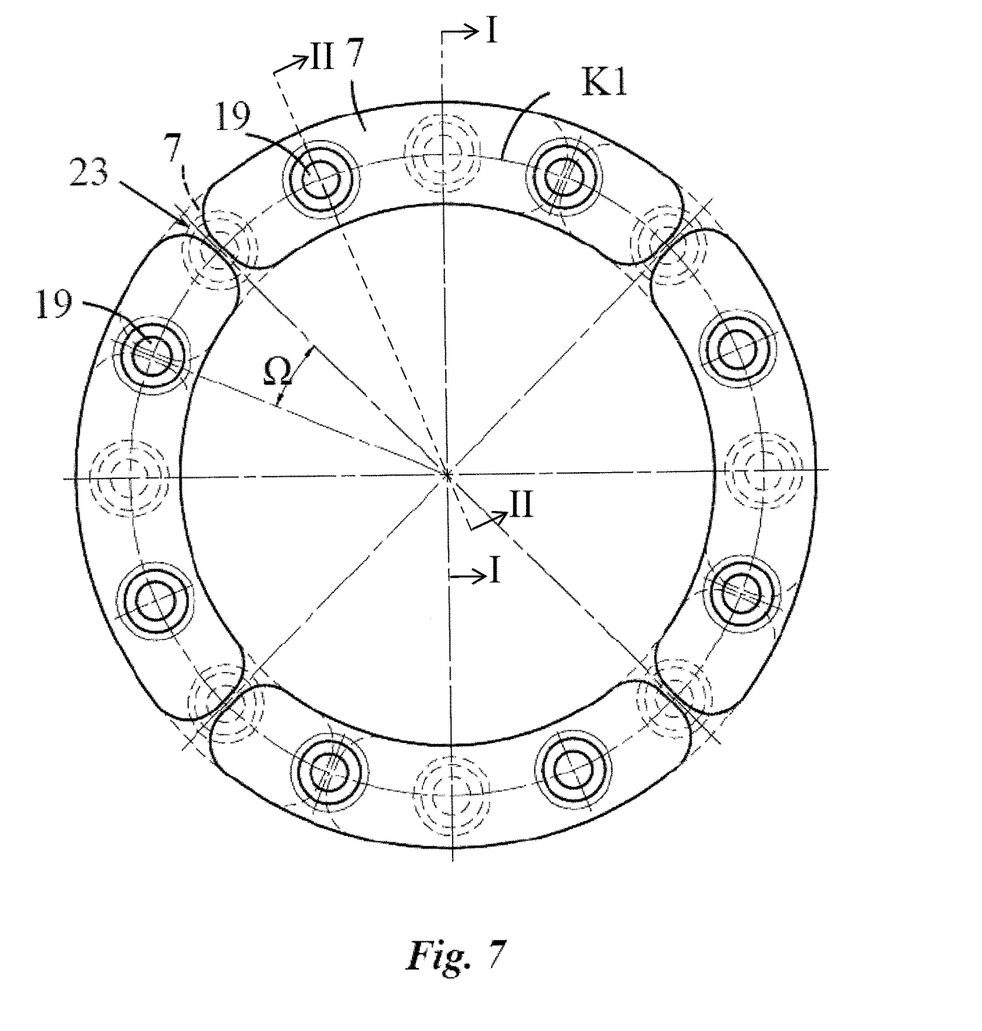
FIG. 7 shows a schematic presentation of a third arrangement according to the invention, offset on the clamp ring and wheel body side, of the circular ring segments of a wheel according to the invention.

FIG. 1 and FIG. 2 show partial sections through a first and a second embodiment of a wheel, respectively, corresponding to cuts marked in FIG. 7 as I-I and II-II, respectively. The wheel comprises a wheel tire 1 or 101, a wheel body 3 or 103, a clamp ring 5 or 105, and a plurality of damping means designed as circular ring segments 7 or 107. The wheel or 101 has a circumferential ridge 9 or 109 extending from the inner circumference of the tire in the direction of the X-X rotation axis. The wheel body is formed as a wheel hub of the wheel, and on its outer circumference and on its axial side face has a ring flange 11 or 111 running radially outward. The clamp ring 5 or 105 is attached in a friction-locking and/or positively locking manner to the wheel body 3 or 103 on a side face opposite the ring flange 11 or 111 by means of fastening means 13. In FIG. 2, the fastening means are not shown, since the partial section of FIG. 2 does not go through the fastening means. The fastening means 13 comprise in particular a plurality of wheel screws and associated threaded holes. By means of the clamp ring 5 or 105, the circular ring segments 7 or 107 are offset by pre-stressing pressure running sideways in an approximately axial direction X-X. Thereby the fastening means 13 are arranged in such a way and distributed along the circumference of the wheel that a uniform pre-stressing of the circular ring segments 7 or 107 can be achieved.

At least two separate circular ring segments 7 or 107 are arranged both between the clamp ring 5 or 105 and the circumferential ridge 9 or 109 of the wheel tire 1 or 101 and between the circumferential ridge 9 or 109 and the ring flange 11 or 111 of the wheel body 3 or 103, and in particular are distributed evenly on each side over the circumference of the circumferential ridge. The circular ring segments 7 or 107 extend in the circumferential direction of the wheel. In particular, their radial height is smaller than their circumferential length at their radial center. The circular ring segments 7 or 107 have a core 15 or 115 made of an elastomer material, wherein the core 15 or 115 of the circular ring segments 7 or 107 is enclosed by metal sheet segments 17 or 117 at least on its contact surfaces that bear against the clamp ring 5 or 105 or the ring flange 11 or 111 and on the circumferential ridge 9 or 109. The elastomer volume of the core 15 or 115 is distributed evenly, in particular in mirror symmetry with the cross-sectional axes of the circular ring segments 7 or 107. On their contact surfaces on at least on one side, and in particular on both sides, the circular ring segments 7 or 107 have a plurality of closed centering cams 19 or 119, in particular two each, preferentially extending in an X-X axial direction. According to the invention, it is possible in particular to arrange only one centering cam 19 or 119 on one contact surface or on one side of the circular ring segments 7 or 107, and to arrange a plurality of centering cams 19 or 119, in particular two, on the other contact surface or side. The metal sheet segments 17 or 117 are fabricated with the centering cams 19 or 119 preferentially from a blank, in particular through reshaping. The centering cams 19 or 119 on one contact surface are arranged spaced from one another in the circumferential direction. The centering cams 19 or 119 mesh in a positively locking manner into corresponding recesses 21 or 121 on the ring flange 11 or 111 or the clamp ring 5 or 105, and/or on the circumferential ridge 9 or 109. In particular, there is play between the centering cams 19 or 119 and a bottom of the recesses 21 or 121 in the circumferential ridge 9 or 109 and/or in the clamp ring 5 or 105 or the ring flange 11 or 111. The position of the circular ring segments 7 or 107 in the wheel is determined by the centering cams 19 or 119 and the recesses 21 or 121, and is unambiguously controllable according to tolerances.

In one advantageous embodiment, a coating is applied to the outer surfaces of the metal sheet segments 17 or 117, in particular only to the base surfaces of the metal segments 17 or 117, i.e. not in the area of the centering cams 19 or 119; the coating is thin, preferentially in the range of 0.1 mm to 3 mm, preferentially made of an elastomer. The elastomer layer or coating avoids the tendency to microslippage and the resultant wear and corrosion between the metal sheet segments 17 or 117 and the bearing surfaces of the adjacent components.

Figure 3:
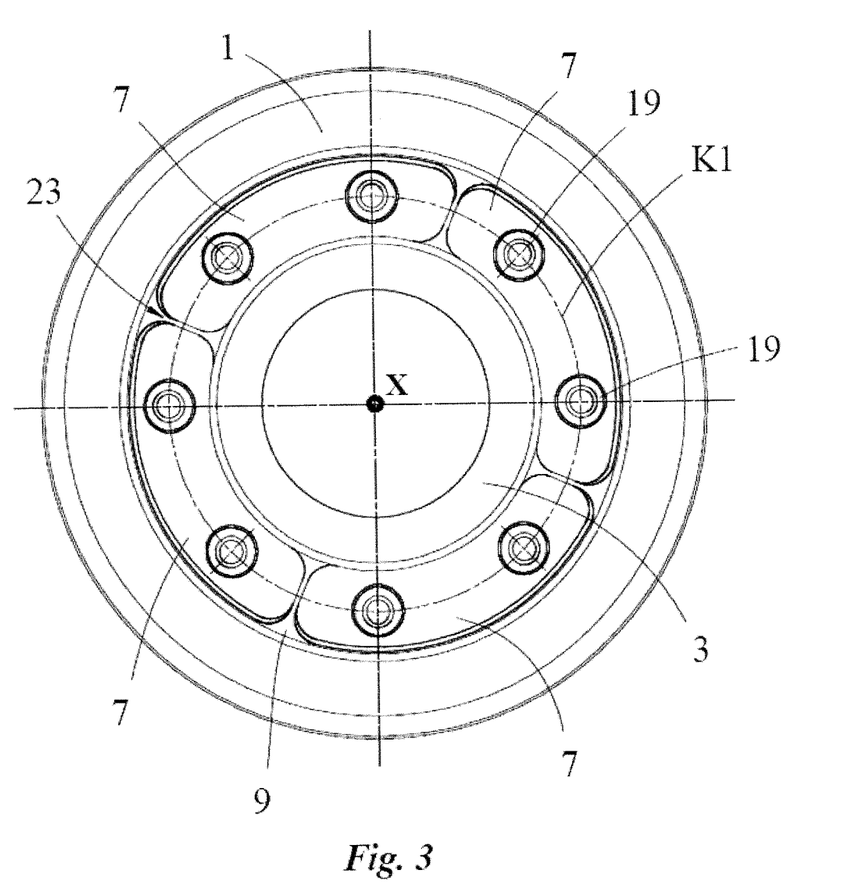
FIG. 3 shows a side view of a wheel according to the invention with a presentation and view of the inset circular ring segments.
Figure 4A:
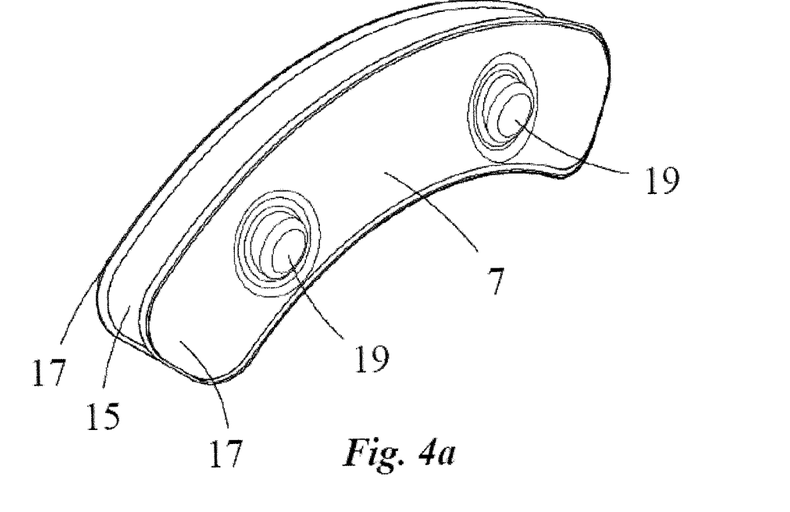
FIG. 4a shows a three-dimensional presentation of a first embodiment of a circular ring segment, not clamped in, for a wheel according to FIG. 1.
Figure 4B:
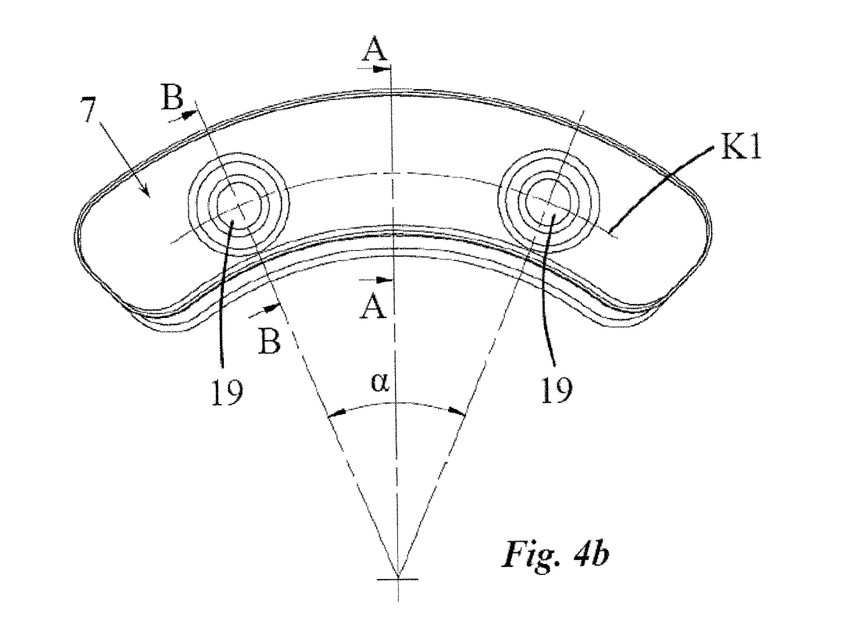
FIG. 4b shows a side view of the first embodiment of a circular ring segment, not clamped in, for a wheel according to FIG. 4a, FIG. 4c shows a cross-section A-A of the circular ring segment according to FIG. 4b.
Figure 4C:
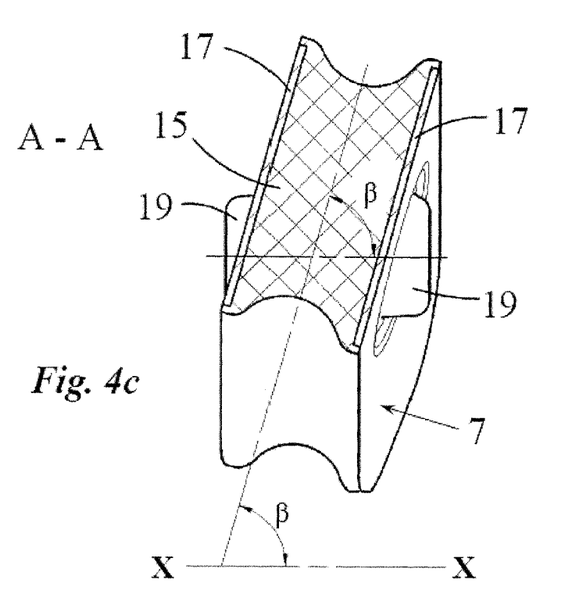
Figure 4D:
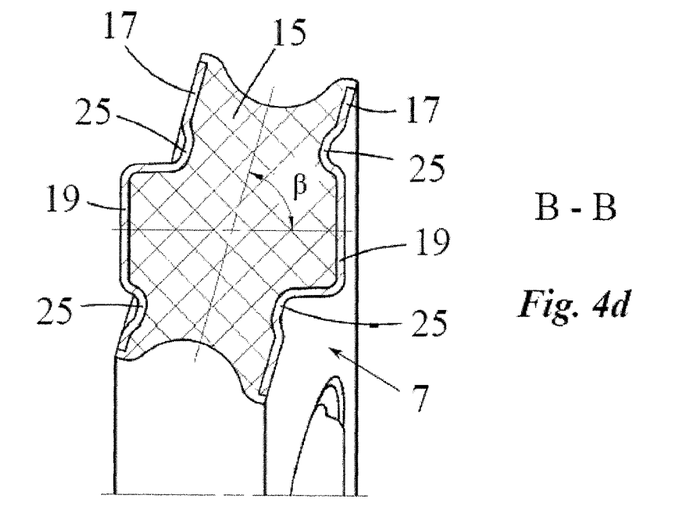
FIG. 4d shows a cross-section B-B of the circular ring segment according to FIG. 4b with centering cams embodied as conical or frustoconical.

As is apparent in the side view of a wheel according to the invention in FIG. 3, in a preferred embodiment, the circular ring segments 7 are arranged side by side circumferentially between the circumferential ridge 9 and the ring flange 11 or the clamp ring 5 in the form of a circular ring, preferentially centered, on a circular path K1 with a constant radius and center point Y of the wheel. Advantageously, the circular ring segments 7 are arranged radially centered on the circular path K1. In particular, four circular ring segments 7 are arranged on each side of the circumferential ridge 9. The number of circular ring segments 7 on one side of the circumferential ridge 9 can essentially be even or odd. And it is especially advantageous if the centering cams 19 are arranged in such a way on the contact surfaces of the circular ring segments 7 that the centering cams 19 also lie with their center point on the circular path K1. In particular, the circular ring segments 7 are designed and arranged on the circular path K1 in such a way that play is available between the adjacent end faces of two circular ring segments 7 in the circumferential direction, and thereby a butt gap 23 is created between the end faces. The butt gaps 23 have, in particular, a circumferential extension of at least 0.05° to a maximum of 1°, preferentially at least 0.2° to a maximum of 0.3°. In standard wheel sizes of rubber-sprung wheels having a rolling surface diameter of 500 mm to 860 mm, the butt gaps have, in particular, a minimum width of 1 mm to a maximum of 10 mm, preferentially from 4 mm to 6 mm. A minimum amount of distance in the circumferential direction between the circular segments 7 prevents the circular ring segments 7 from touching as a result of manufacturing tolerances and upon compression of the elastomer; this simplifies the assembly of the damping means. In addition, such a butt gap allows ventilation of the damping means and thereby cooling of the components. Larger butt gaps 23 reduce the effective elastomer volume and thereby the weight supporting capability of the circular ring segments 7.

The centering cams 19 of the circular ring segment 7 are each formed, in particular, as a closed cup, in which the elastomer material of the core 15 is completely enclosed and sealed by the metal sheet segments 17. Advantageously, the circular ring segments 7 are formed as a compound component composed of the core 15 made of elastomer material and the molded integral metal sheet segments 17. The metal sheet segments 17 are connected in a positively locking manner to the elastomer material of the core 15, in particular by vulcanizing, gluing, or pressing.

Figure 10A:
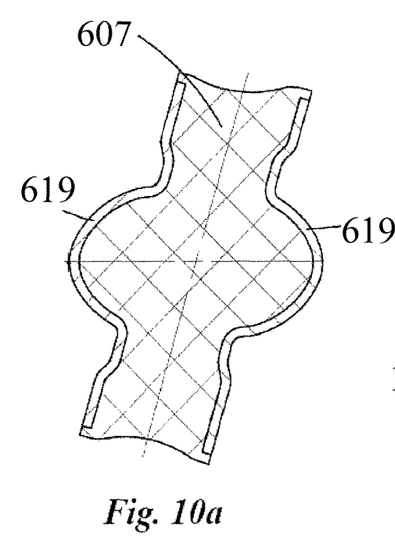
FIG. 10a shows a cross-section through another embodiment of a circular ring segment according to the invention with parabolic centering cams.
Figure 10B:
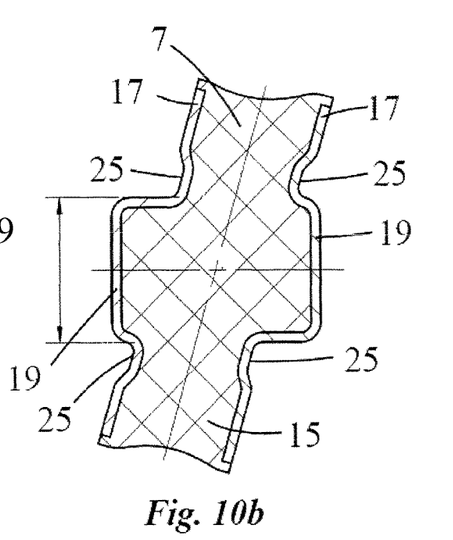
FIG. 10b shows a cross-section through a further embodiment of a circular ring segment with cylindrical centering cams.

In FIGS. 4a, 4b, 4c, and 4d an advantageous embodiment of the circular ring segment 7 according to the invention is presented. The outer form of the centering cams 19 of the circular ring segment 7 is preferentially frustoconical in shape. This allows, in particular, a precisely aligned assembly and a firm seat of the circular ring segments 7 in the recesses 21. The circular ring segments 7 can be prevented from falling out of the recesses 21 during assembly or disassembly by the special shaping and by enclosing them with the metal sheet segments 17. In this embodiment, the centering cams 19 of a circular ring segment 7, which are opposite one another on different contact surfaces in the axial direction, run radially at the same distance from the rotation axis X-X. The contact surfaces of the circular ring segments 7 and in particular of the metal sheet segments 17 are advantageously designed and arranged in such a way that they enclose an acute angle β in a range of greater than 45° up to 90°, preferentially 74°, with the rotation axis X-X. It is especially advantageous that at the transition area between the basic form of the metal sheet segment 17 and the centering cams 19 of the circular ring segment 7, a bead 25 consisting of radii is formed, which is set inward into the elastomer material of the core 15 and runs around the centering cams 19. Alternatively, the centering cams 19 may also be designed as parabolic or cylindrical in shape, as seen for example in FIGS. 10a, 10b, or as frustoconical, as also seen in FIG. 2.

Figure 5A:
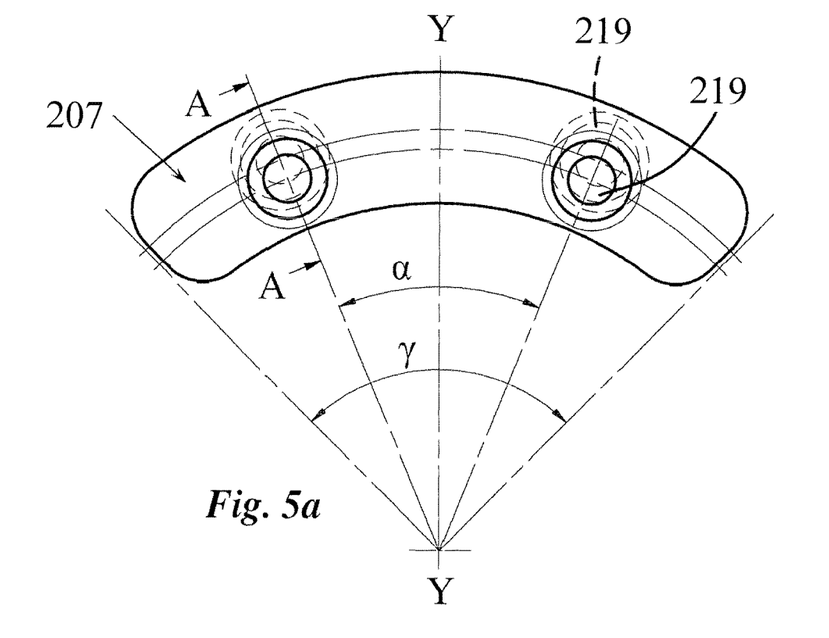
FIG. 5a shows a side view of a third embodiment of a circular ring segment, not clamped in, for a wheel according to the invention.
Figure 5B:
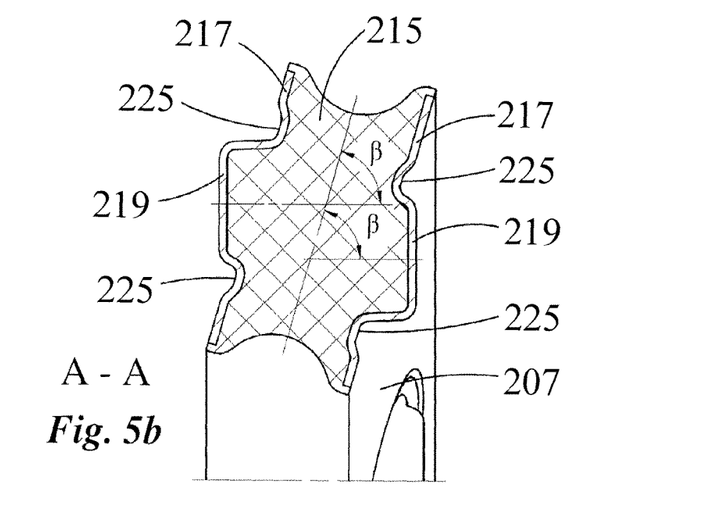
FIG. 5b shows a cross-section A-A of the circular ring segment according to FIG. 5a, FIG. 6 shows a schematic presentation of a second arrangement according to the invention of the circular ring segments of a wheel according to the invention.

In FIG. 5a, 5b another embodiment of the circular ring segment 207 according to the invention is presented. In this embodiment, the centering cams 219 of a circular ring segment 207, which are opposite one another on different contact surfaces in the axial direction, run radially at different distances from the rotation axis X-X. They are thus offset radially relative to one another.

All circular ring segments 7, 107, or 207 of a wheel are advantageously designed the same as an individual part. The circular ring segments 7, 107, or 207 are designed, in particular, as mirror symmetrical to their central cross-sectional axis Y-Y. It is especially advantageous for a circular ring segment 7, 107, or 207 to extend over a circular segment of the wheel with a central angle γ of 60° to 120°, preferentially of 90°. In standard wheel sizes of rubber-sprung wheels, an extension of at least 30° is preferred, in particular at least 60°, so that the centering cams 19, 119, or 219 can be made in a stable production form. With a preferred extension of 90°, an optimal state is achieved between manufacturing costs of the damping elements, manufacturing costs of the remaining wheel components, and a stable embodiment of the centering cams 19, 119, or 219. In particular, the distance between the center points of two centering cams 19, 119, or 219 in the circumferential direction on a contact surface of a circular ring segment 7, 107, or 207 is designed such that the center points of the centering cams 19, 119, or 219 enclose a circular segment of the wheel with a central angle α of 15° to 90°, preferentially 45°.

Figure 6:
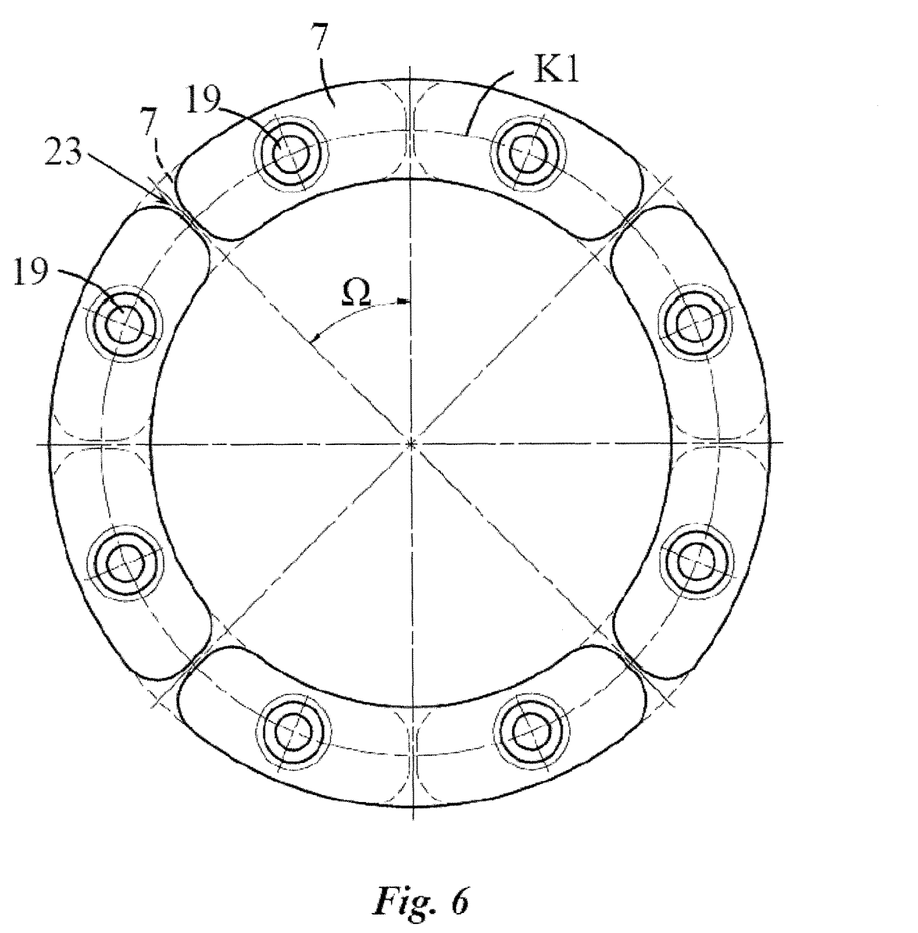

In an advantageous embodiment according to FIG. 6 or according to FIG. 7, the circular ring segments 7 on one side of the circumferential ridge 9 of the wheel tire 1 are arranged offset from the circular ring segments 7 on the other side of the circumferential ridge 9 by a set angle Ω of 15° to 60°, in particular 45°.

Figure 8:
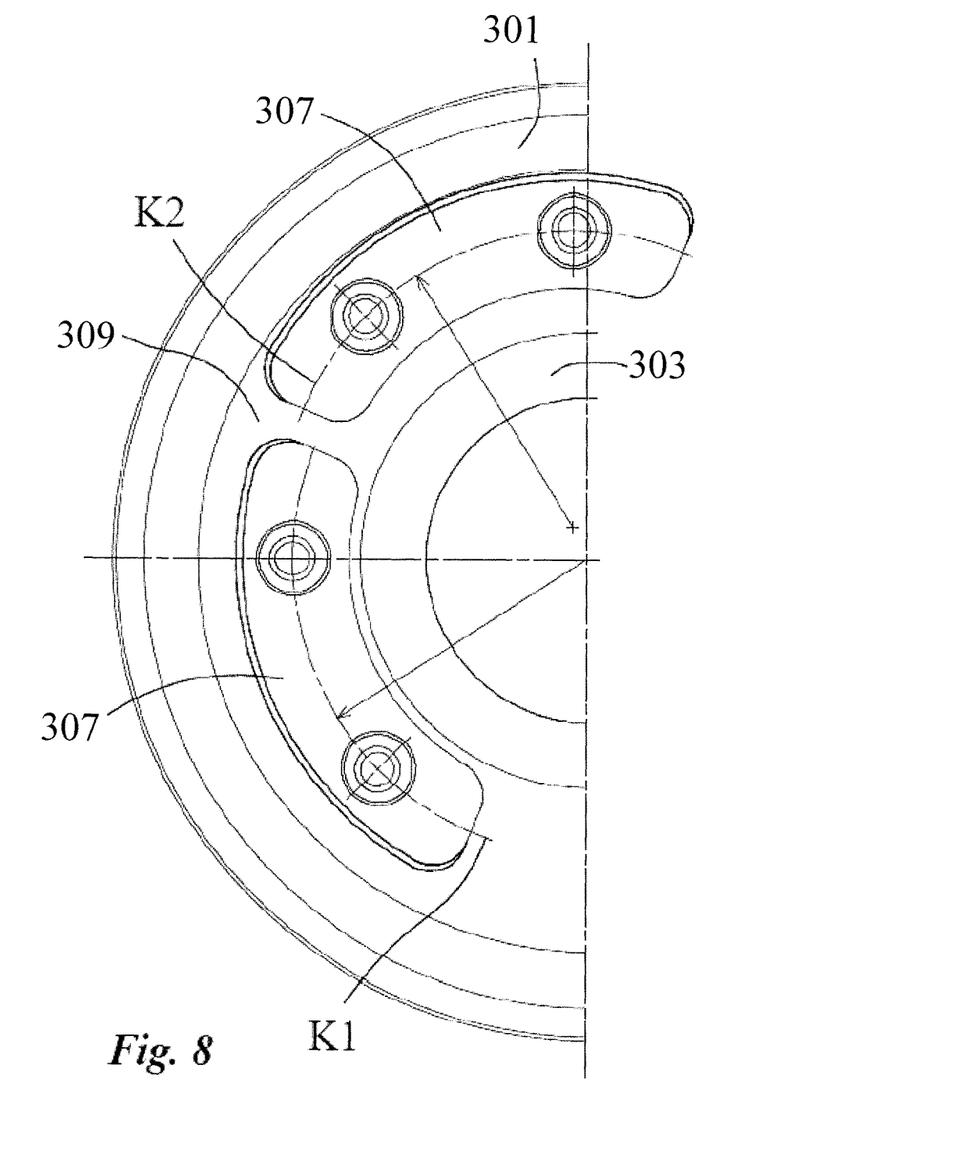
FIG. 8 shows a schematic presentation of a fourth arrangement according to the invention with circular ring segments of a wheel according to the invention arranged on various circular paths.

According to FIG. 8, in another advantageous embodiment, the circular ring segments 307 between the circumferential ridge 9 and the ring flange or the clamp ring (not shown in FIG. 8) on one side of the circumferential ridge 9 are arranged offset from one another in at least two groups that have different circular paths K1 and K2 with different radii in relation to the rotation axis. It is advantageous for the groups of the circular ring segments 307 to be arranged mirror symmetrically to the center plane of the wheel, with the butt gaps 323 of the circular ring segments 307 of the individual groups being set at an angle relative to one another.

Figure 9A:
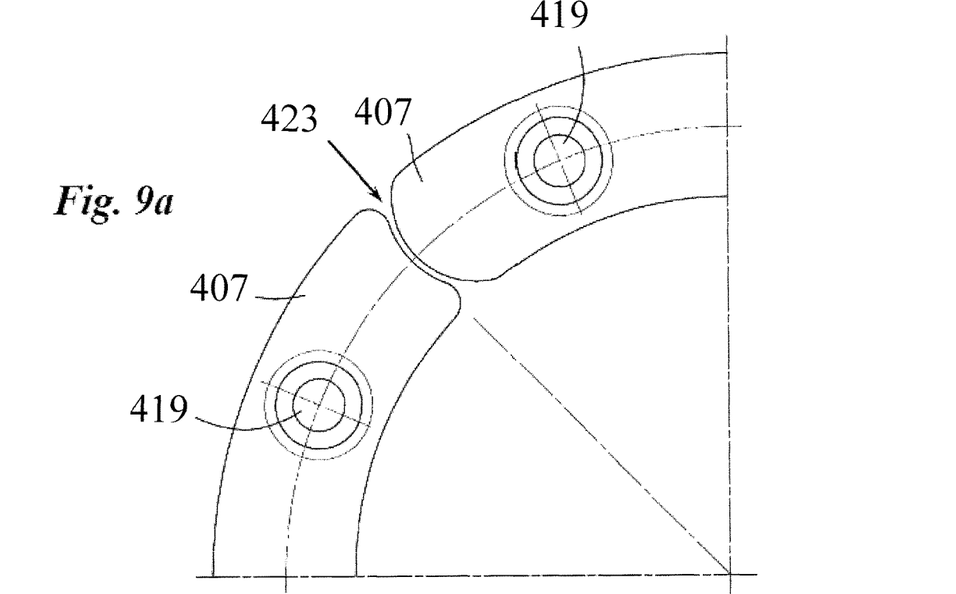
FIG. 9a shows a partial side view of another embodiment of two adjacent overlapping ends of circular ring segments according to the invention for a wheel according to the invention.
Figure 9B:
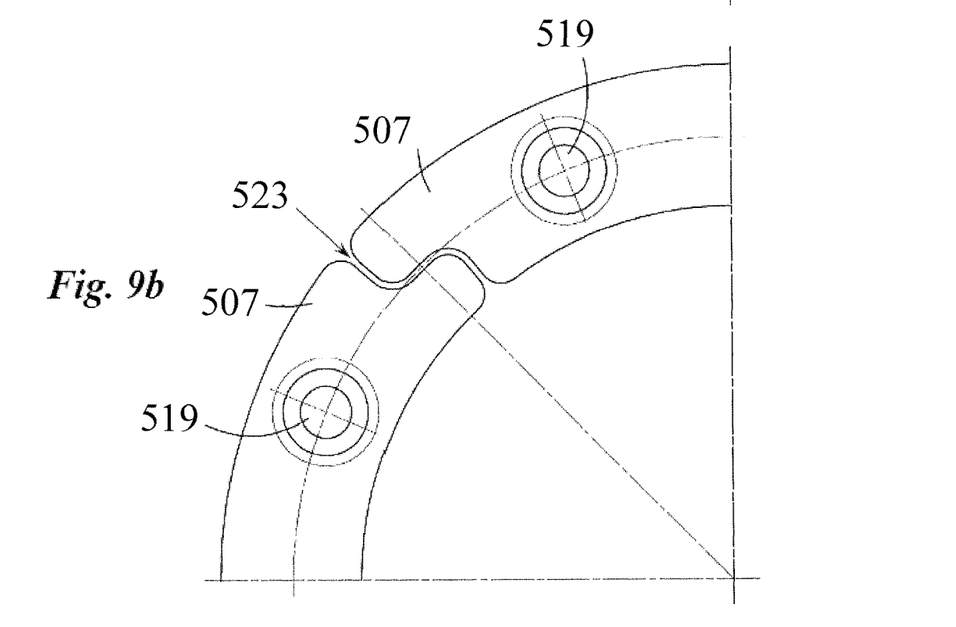
FIG. 9b shows a partial side view of another embodiment of two adjacent overlapping ends of circular ring segments according to the invention for a wheel according to the invention.

In FIGS. 9a and 9b other advantageous embodiments of the ends of the circular ring segments 407 and 507 are shown, in which two adjacent circular ring 407 and 507 are configured as overlapping at their respective ends between the butt gaps 423 and 523, respectively.

Figure 11:
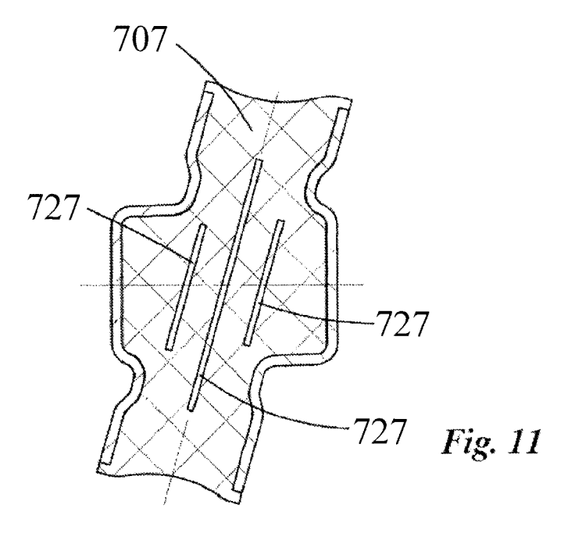
FIG. 11 shows a cross-section through another embodiment of a circular ring segment according to the invention with inlays made of various possible materials, geometries, number, and positioning in the core.

FIG. 11 shows another advantageous embodiment of a circular ring segment 707, in which inlays 727 are additionally arranged in the elastomer layer of the core 715. The inlays may be made of various materials, with various geometries, and in various numbers or positions. In particular, they can consist of metal sheets or wires, or can be formed as meshes or pads. This allows the elasticity of the circular ring segments 7 to be adjusted to specific spring or damping requirements.

The ring flange 11 or 111 of the wheel body 3 or 103, the clamp ring 5 or 105, and the circumferential ridge 9 or 109 of the wheel tire 1 or 101 have contact surfaces and corresponding recesses 21 or 121 that are designed for precise alignment with the embodiment of the circular ring segment 7 or 107 according to the invention used.

Figure 12:
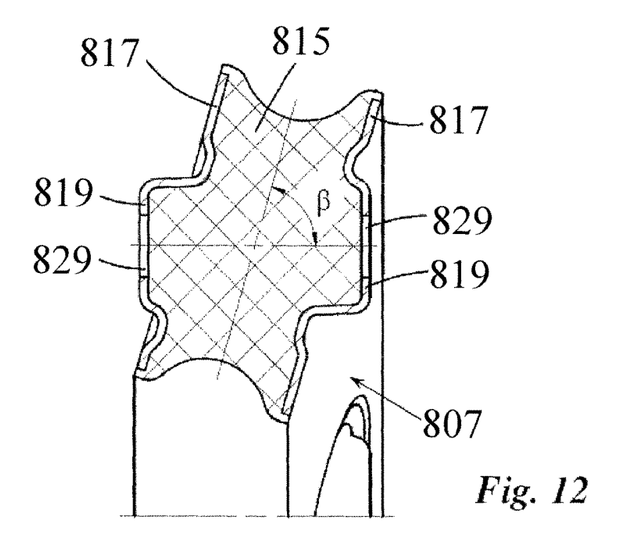
FIG. 12 shows a cross-section through another embodiment of the circular ring segment according to the invention with an opening in the metal sheet segments.

FIG. 12 shows another advantageous embodiment of a circular ring segment 807 according to the invention. In the area of the centering cams 819, at least one opening 829 is arranged in the metal sheet segments 817. The opening 829 may be filled by material from the core 815 or, as shown here, may not filled by material of the core 815. The opening is preferentially located centered in the centering cam 819. The opening 829 in particular has the advantage of simplifying the forming process of the metal sheet segments 817, in particular when stronger or thicker materials are used. Advantageously, in this way a reforming of the metal sheet segments 817 for a precise alignment can be achieved more easily. The opening 829 is conceivable in particular in combination with all of the embodiments of the centering cams 819 described above.

While the above description constitutes the preferred embodiments of the present invention, it will be appreciated that the invention is susceptible to modification, variation and change without departing from the proper scope and fair meaning of the accompanying claims.

The invention claimed is:

1. A wheel for a rail vehicle, comprising a wheel tire with a circumferential ridge formed on an inner circumference of the wheel tire and extending circumferentially in the direction of a rotation axis of the wheel, a wheel body with a ring flange formed on an outer circumference and on an axial side face of the wheel body and extending radially outward, and a clamp ring attached to the wheel body in a friction-locking or positively locking manner via a fastening means on a side face opposite the ring flange, with damping means being arranged between the clamp ring and the circumferential ridge of the wheel tire and between the circumferential ridge of the wheel tire and the ring flange of the wheel body, wherein each of the damping means is configured as at least two separate circular ring segments extending in the circumferential direction of the wheel, each circular ring segment extending over a circular segment of the wheel having a central angle of at least 30° to a maximum of 180°, wherein the circular ring segments have contact surfaces with, at least on one side, at least two centering cams extending in the axial direction and spaced apart in the circumferential direction, which mesh in a positively locking manner into corresponding recesses on the circumferential ridge of the wheel tire and on the ring flange of the wheel body or on the clamp ring, wherein the circular ring segments have a core made of an elastomer material, wherein the core of the circular ring segments is enclosed by metal sheet segments, at least on the contact surfaces bearing against the circumferential ridge of the wheel tire and against the clamp ring or the ring flange of the wheel body.

2. The wheel according to claim 1, wherein on one of the contact surfaces or on one side of each of the circular ring segments, a centering cam is arranged, and on another contact surface or side, a plurality of centering cams are arranged.

3. The wheel according to claim 1, wherein each of the circular ring segments has exactly two centering cams on each contact surface.

4. The wheel according to claim 1, wherein each of the centering cams of the circular ring elements has a frustoconical, cylindrical or parabolic shape.

5. The wheel according to claim 1, wherein at a transition area between a base of the metal sheet segment and the centering cams of the circular ring segment, a bead consisting of radii is formed, which is set inward into the elastomer material and extends around the centering cams.

6. The wheel according to claim 1, wherein the circular ring segments extend next to one another and form a circular ring on a circular path having a constant radius between the circumferential ridge and the ring flange or the clamp ring.

7. The wheel according to claim 6, wherein the circular ring segments are configured and are arranged on the circular path with play between adjacent end faces of two circular ring segments in the circumferential direction, thereby forming a butt gap between the adjacent end faces with a circumferential width of at least 0.05° to a maximum of 1°.

8. The wheel according to claim 7, wherein groups of the circular ring segments are arranged mirror symmetrically to a center plane of the wheel, the butt gaps of the circular ring segments of the individual groups being set at an angle to one another.

9. The wheel according to claim 7, wherein two adjacent circular segments are configured as overlapping at their respective ends between the butt gaps.

10. The wheel according to claim 7, wherein the width of the butt gap is 0.2° to 0.3°.

11. The wheel according to claim 1, wherein the circular ring segments are arranged offset from one another between the circumferential ridge and the ring flange or the clamp ring, in at least two groups that have different circular paths with different radii in relation to the rotation axis.

12. The wheel according to claim 1,
wherein play is present between the centering cams and the bottom of the recesses in the circumferential ridge, and also at least in one of the clamp ring or the ring flange.

13. The wheel according to claim 1,
wherein the contact surfaces of the circular ring segments surfaces of the circumferential ridge and also of at least the clamp ring or the ring flange bearing against the contact surfaces extend perpendicular to the rotation axis.

14. The wheel according to claim 1,
wherein the contact surfaces of the circular ring segments and surfaces of the circumferential ridge and also of at least the clamp ring or the ring flange bearing against the contact surfaces enclose an angle of 45° to 90° with the rotation axis.

15. The wheel according to claim 1,
wherein one of the circular ring segments extends over a circle segment of the wheel that has a central angle of 60° to 120°.

16. The wheel according to claim 1,
wherein the distance in the circumferential direction between the center points of two centering cams on the contact surface of one of the circular ring segments is designed such that the center points of the centering cams enclose a circular segment of the wheel having a central angle of 15° to 90°.

17. The wheel according to claim 1,
wherein the centering cams of one of the circular ring segments that are opposite one another in the axial direction on different contact surfaces extend radially at different distances from the rotation axis.

18. The wheel according to claim 1,
wherein in the area of the centering cams, at least one opening is located in the metal sheet segments.

19. The damping means for use in the wheel according to claim 1.

20. The wheel tire to be used in the wheel according to claim 1.

* * * * *